(12) United States Patent
Zhang et al.

(10) Patent No.: US 7,573,770 B1
(45) Date of Patent: Aug. 11, 2009

(54) DISTRIBUTED FRONT-END FIFO FOR SOURCE-SYNCHRONIZED INTERFACES WITH NON-CONTINUOUS CLOCKS

(75) Inventors: Fulong Zhang, Allentown, PA (US); Harold Scholz, Allentown, PA (US); Larry Fenstermaker, Nazareth, PA (US); John Schadt, Bethlehem, PA (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 287 days.

(21) Appl. No.: 11/778,457

(22) Filed: Jul. 16, 2007

(51) Int. Cl.
*G11C 7/00* (2006.01)

(52) U.S. Cl. ............. 365/221; 365/189.05; 365/189.02; 365/189.07; 365/233

(58) Field of Classification Search ............ 365/189.02, 365/221, 189.05, 233, 189.07
See application file for complete search history.

(56) References Cited

U.S. PATENT DOCUMENTS

| 7,009,433 | B2 | 3/2006 | Zhang |
| 7,109,756 | B1 | 9/2006 | Zhang |
| 7,221,613 | B2 * | 5/2007 | Pelley et al. ............ 365/230.03 |
| 2006/0050827 | A1 * | 3/2006 | Saeki et al. ................ 375/362 |

\* cited by examiner

*Primary Examiner*—Son Dinh
(74) *Attorney, Agent, or Firm*—Mendelsohn, Drucker & Associates, P.C.

(57) ABSTRACT

In one embodiment of the invention, an integrated circuit, such as an FPGA, comprises a distributed FIFO architecture that supports data transfer from an external device, such as an SDRAM, via an interface that receives a non-continuous, asynchronous strobe clock and a data lane having a plurality of bit lines from the external device. The distributed FIFO architecture comprise a FIFO for each bit line and a FIFO controller. Under control of the FIFO controller, data is written into each FIFO using a FIFO write clock based on the strobe clock, while data is read out from each FIFO using a FIFO read clock based on a local reference clock of the integrated circuit. The distributed FIFO architecture is designed to handle a range of possible phase differences between the FIFO write and read clocks to safely convert from the asynchronous, non-continuous strobe domain to a local continuous clock domain.

20 Claims, 6 Drawing Sheets

100

124

122

DISTRIBUTED FRONT-END FIFO FOR SOURCE-SYNCHRONIZED INTERFACES WITH NON-CONTINUOUS CLOCKS

TECHNICAL FIELD

The present invention relates to electronic systems, and, in particular, to interfaces for clock and data transfer between electronic components in which the receiving component receives a clock signal from the transmitting component that is both non-continuous and asynchronous with local reference clocks in the receiving component.

BACKGROUND

In an electronic system, an integrated circuit, such as an FPGA, may interface with an external memory device, such as a synchronized dynamic random access memory (SDRAM). To write data to the SDRAM, the FPGA provides control, address, clock, and data signals to the SDRAM, which uses the clock signals to determine when to sample the data signals in order to store the provided data at the specified address locations. To read data from the SDRAM, the FPGA provides control, address, and clock signals to the SDRAM, which retrieves the stored data from the specified address locations and transmits the retrieved data to the FPGA along with a clock signal that the SDRAM generated from the clock signal provided to it by the FPGA. The FPGA uses the clock signal received from the SDRAM, which is synchronized with the data signals received from the SDRAM, to determine when to sample those data signals for storage and further processing within the FPGA.

During read operations, the clock signal provided by the SDRAM to the FPGA is typically a non-continuous clock (also referred to as a strobe) that lasts only as long as the transmitted burst of retrieved data. For example, in a double data rate (DDR) transfer of data, where each rising and falling edge of the clock signal corresponds to a bit transition in each serial bit stream of retrieved data, the strobe contains a number of clock pulses equal to half the number of data bits in each serial bit stream.

Due to skew resulting from (sometimes indeterminate and/or variable) round-trip delay from the time that the FPGA transmits its clock signal to the SDRAM until the time that the FPGA receives the strobe from the SDRAM, the strobe will typically be asynchronous relative to the FPGA's local reference clock signals.

The non-continuous and asynchronous nature of the clock signal provided by the SDRAM must be taken into consideration when designing an FPGA with the capability of reading data from such an external SDRAM. Providing this capability gets more difficult as clock speeds and data transfer rates increase with newer technology.

SUMMARY

In one embodiment of the present invention, an integrated circuit comprises one or more data I/O blocks, a clock I/O block, one or more FIFOs, and a FIFO controller. At least one data I/O block receives an incoming bit stream from an external device. The clock I/O block receives an incoming clock signal from the external device, where the incoming clock signal is asynchronous with a local reference clock signal of the integrated circuit. At least one FIFO is connected to receive a corresponding incoming bit stream from a corresponding data I/O block. The FIFO controller controls operations of the one or more FIFOs, such that (i) bits from the corresponding data I/O block are written into the at least one FIFO using a FIFO write clock that is based on the incoming clock signal and (ii) bits are read out from the at least one FIFO using a FIFO read clock that is based on the local reference clock signal.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
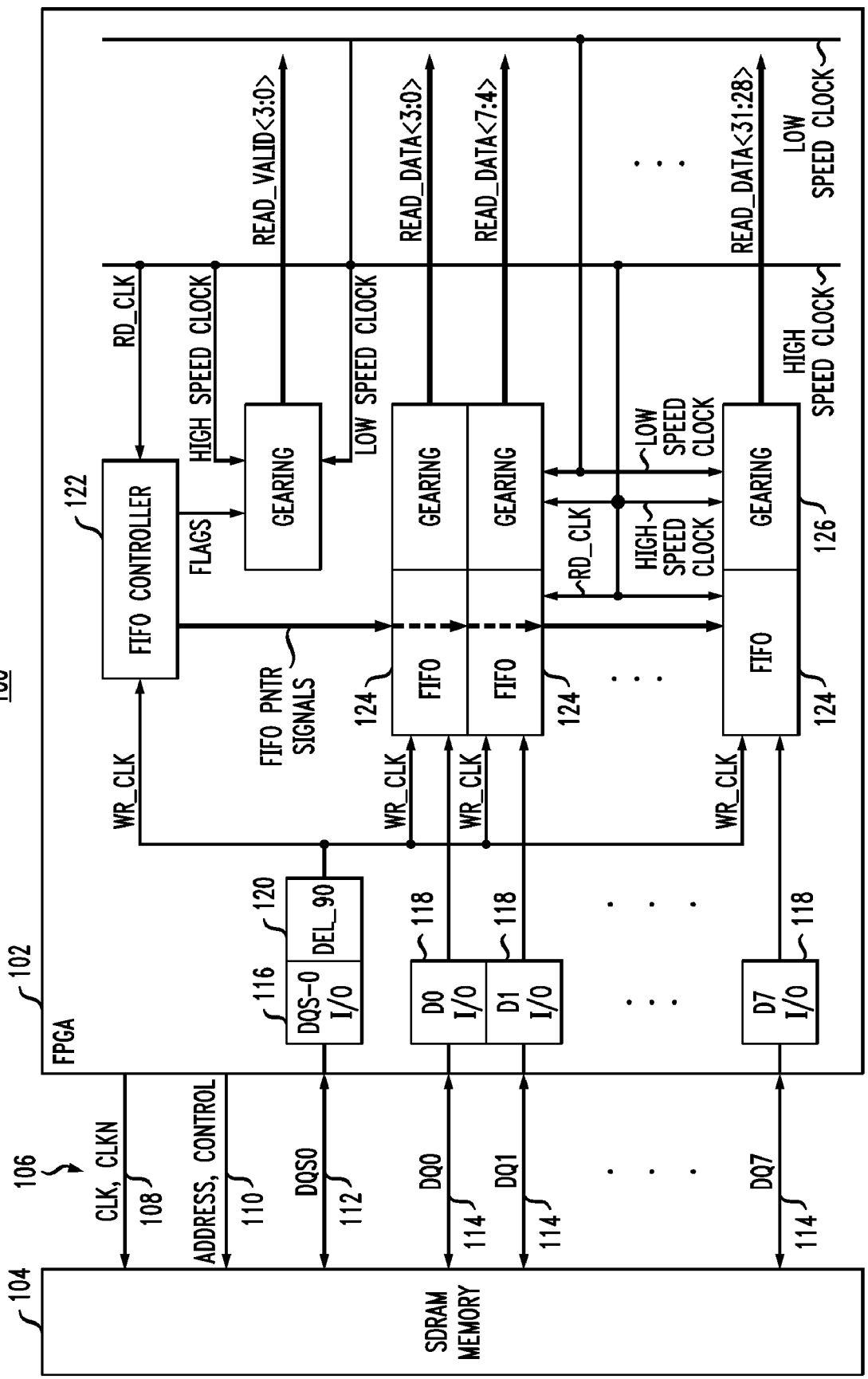
FIG. 1 shows a block diagram of a portion of an electronic system having an FPGA configured to write data to and read data from an external SDRAM memory device, according to one embodiment of the present invention.

FIG. 1 shows a block diagram of a portion of an electronic system 100 having an FPGA 102 configured to write data to and read data from an external SDRAM memory device 104, according to one embodiment of the present invention. As shown in FIG. 1, interface 106 between FPGA 102 and SDRAM 104 includes clock (CLK, CLKN) lines 108, address/control lines 110, bi-directional strobe clock (DQS0) line 112, and a data lane consisting of eight bi-directional bit (DQ0-DQ7) lines 114. As represented in FIG. 1, FPGA 102 has a distributed front-end First-In, First-Out (FIFO) architecture that includes FIFO controller 122 and a plurality of FIFO structures (FIFOs) 124. This distributed front-end FIFO architecture handles the receipt of incoming data read from SDRAM 104 via interface 106. As described more fully below, the distributed front-end FIFO architecture may be used to capture non-continuous or continuous data/clock traffic and transfer the data reliably from an asynchronous external clock domain into an internal continuous clock domain having the same clock frequency.

Those skilled in the art will appreciate that FIG. 1 shows only a portion of the circuitry of FPGA 102 that is related to data read operations associated with interface 106. For example, although FIG. 1 shows only one strobe line 112 and one 8-bit data lane 114, it will be understood that interface 106 between FPGA 102 and SDRAM 104 can have multiple data lanes, each with its corresponding strobe line. It will also be understood that, in other embodiments, each data lane may have other than eight bit lines.

During data read operations, FPGA 102 provides clock, address, and control signals via lines 108 and 110 to SDRAM 104, which responds by providing strobe DQS0 and eight data bit streams DQ0-DQ7 via lines 112 and 114 to FPGA 102. As shown in FIG. 1, FPGA 102 has clock input/output (I/O) block 116 and data I/O blocks 118 associated with and connected to lines 112 and 114, respectively. When not reading, strobe line 112 and data lines 114 would be either tri-stated (i.e., bus idle) or driven by FPGA 102 to write data to SDRAM 104.

In this particular embodiment, SDRAM 104 provides strobe DQS0 synchronized with bit streams DQ0-DQ7 (i.e., read data DQ[7:0] is edge-on-edge with strobe DQS0), such that each rising and falling edge in strobe DQS0 coincides with a bit transition in each of bit streams DQ0-DQ7. Since bit streams are typically and desirably sampled at the midpoint between consecutive bit transitions, delay block 120 delays strobe DQS0 by 90 degrees to enable proper sampling of bit streams DQ0-DQ7. An exemplary implementation of delay block 120 is described in U.S. Pat. No. 7,009,433, the teachings of which are incorporated herein by reference. Note that, for SDRAMs that provide a strobe that is already sufficiently offset in phase from the received bit streams, delay block 120 may be omitted. The resulting delayed strobe is distributed as the first-in, first-out (FIFO) write clock WR_CLK through a clock tree to each FIFO 124 and to FIFO controller 122, which uses the FIFO write clock to control the writing of sampled data from bit streams DQ0-DQ7 into the corresponding FIFOs 124. FIFO controller 122 also receives a continuous local FPGA reference clock, which is the FIFO read clock RD_CLK used to control the reading of data stored in FIFOs 124, where the FIFO read clock RD_CLK has the same frequency as the FIFO write clock WR_CLK.

In this particular embodiment, gearing blocks 126 convert the high-speed I/O data flow from FIFOs 124 into relatively lower-speed (in this embodiment, by a factor of four) data streams for processing by the FPGA core (not shown). An exemplary embodiment of gearing blocks 126 is described in U.S. Pat. No. 7,109,756, the teachings of which are incorporated herein by reference.

Figure 2:
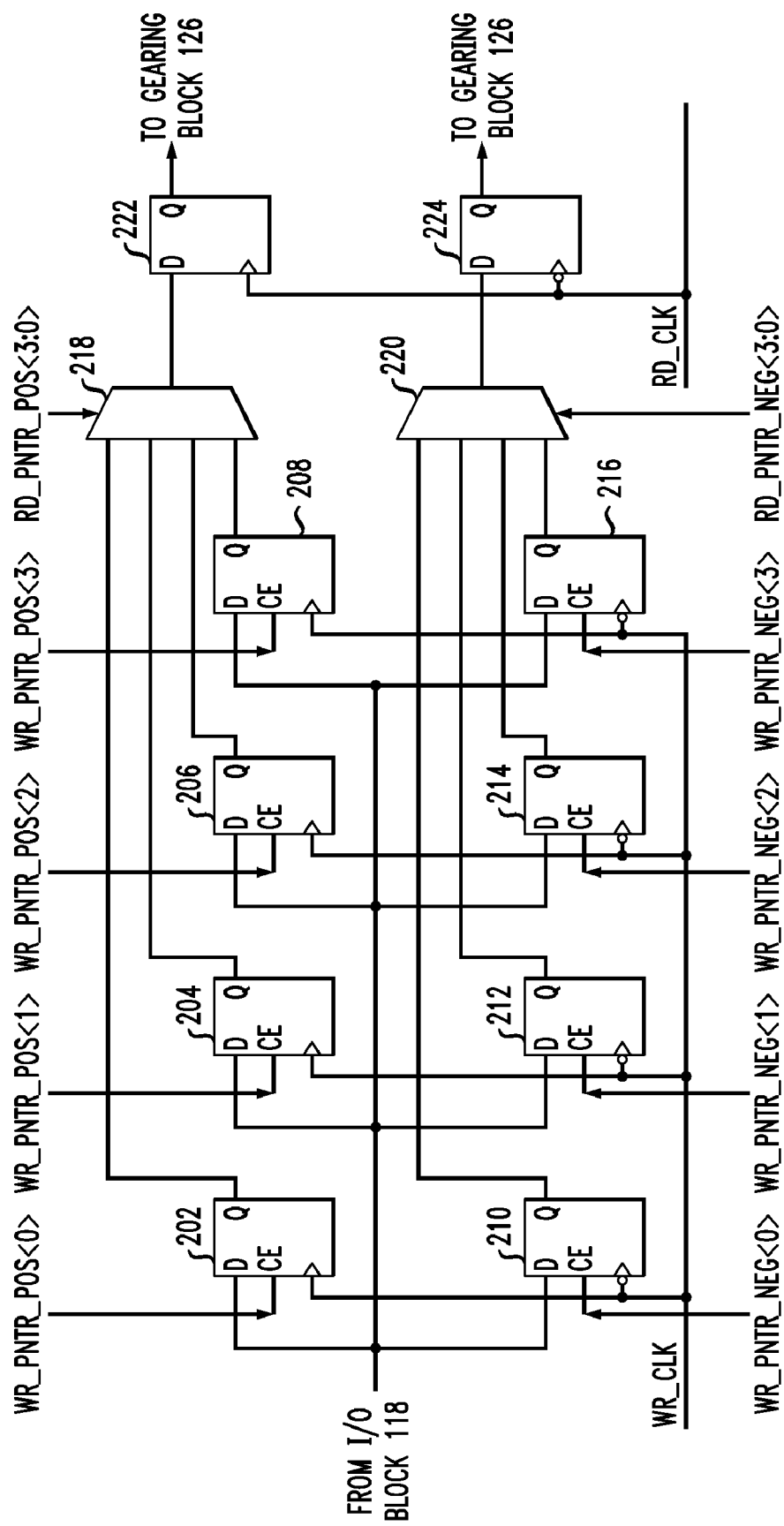
FIG. 2 shows a schematic block diagram of each FIFO of FIG. 1.

FIG. 2 shows a schematic block diagram of each FIFO 124 of FIG. 1. As indicated in FIG. 1, FIFO controller 122 provides FIFO pointers signals to each FIFO 124. The pointer signals are shown in FIG. 2 as four positive write pointers WR_PNTR_POS<3:0>, four negative write pointers WR_PNTR_NEG<3:0>, four positive read pointers RD_PNTR_POS<3:0>, and four negative read pointers RD_PNTR_NEG<3:0>. The four positive write pointers are applied to the enable inputs of positive-edge-triggered flip-flops 202-208, respectively, while the four negative write pointers are applied to the enable inputs of negative-edge-triggered flip-flops 210-216, respectively. The FIFO write clock WR_CLK is applied to the clock inputs of flip-flops 202-208 and to the inverting clock inputs of flip-flops 210-216. The data input D of each of flip-flops 202-216 is connected to the output of the corresponding I/O block 118 of FIG. 1. The four data outputs Q of flip-flops 202-208 are connected to the four data inputs of mux 218, while the four data outputs Q of flip-flops 210-216 are connected to the four data inputs of mux 220.

Positive read pointers RD_PNTR_POS<3:0> control which of the four data inputs is provided as the data output from mux 218, while negative read pointers RD_PNTR_NEG<3:0> control which of the four data inputs is provided as the data output from mux 220. The data output from mux 218 is applied to the data input of positive-edge-triggered flip-flop 222, which is clocked by FIFO read clock RD_CLK, while the data output from mux 220 is applied to the data input of negative-edge-triggered flip-flop 224, which is clocked by an inverted version of FIFO read clock RD_CLK. The data outputs Q of flip-flops 222 and 224 are provided to the corresponding gearing block 126 of FIG. 1.

Flip-flops 202-208 form a 4-bit-deep bit buffer for the data bits corresponding to rising edges in FIFO write clock WR_CLK (e.g., data bits b0, b2, b4, etc., in bit stream (b0, b1, b2, b3, b4, b5, . . . )), while flip-flops 210-216 form a 4-bit-deep buffer for the data bits corresponding to falling edges in FIFO write clock WR_CLK (e.g., data bits b1, b3, b5, etc.).

Table I shows the sequence of processing of flip-flops 202-216 to read bits b0-b9 into FIFO 124 of FIG. 2, according to one implementation of FPGA 102.

TABLE I

FIFO INPUT OPERATIONS

| Bit | WR PNTR POS<3:0> | WR PNTR NEG<3:0> | Flip-flop |
| --- | --- | --- | --- |
| b0 | (0001) | | 202 |
| b1 | | (0001) | 210 |
| b2 | (0010) | | 204 |
| b3 | | (0010) | 212 |
| b4 | (0100) | | 206 |
| b5 | | (0100) | 214 |
| b6 | (1000) | | 208 |
| b7 | | (1000) | 216 |
| b8 | (0001) | | 202 |
| b9 | | (0001) | 210 |

As indicated in Table I, when bit b0 is received from the corresponding I/O block 118 of FIG. 1, the positive write pointer WR_PNTR_POS<3:0> has a value of (0001), which enables flip-flop 202 to read bit b0 on the next rising edge of the FIFO write clock WR_CLK, while disabling flip-flops 204-208. When the next bit (i.e., b1) is received from the corresponding I/O block 118, the negative write pointer WR_PNTR_NEG<3:0> has a value of (0001), which enables flip-flop 210 to read bit b1 on the next falling edge of the FIFO write clock WR_CLK, while disabling flip-flops 212-216. When the next bit (i.e., b2) is received from the corresponding I/O block 118, the positive write pointer WR_PNTR_POS<3:0> has a value of (0010), which enables flip-flop 204 to read bit b2 on the next rising edge of the FIFO write clock WR_CLK, while disabling flip-flops 202, 206, and 208. When the next bit (i.e., b3) is received from the corresponding I/O block 118, the negative write pointer WR_PNTR_NEG<3:0> has a value of (0010), which enables flip-flop 212 to read bit b3 on the next falling edge of the FIFO write clock WR_CLK, while disabling flip-flops 210, 212, and 216. The processing continues in a similar manner until bit b7 is read into flip-flop 216. After that, the positive and negative write pointers recycle to (0001) to enable bits b8 and b9 to be read into flip-flops 202 and 210, respectively.

If the data burst from the corresponding I/O block 118 contains more bits, then the processing continues in a similar manner for those additional bits. However long the data burst is (including possibly shorter than the 10-bit burst represented in Table I), at the end of the data burst, the positive and negative write pointers will have particular values that will depend on the exact size of the data burst. In one implementation of FPGA 102, the next data burst will continue from where the previous data burst left off. For example, if the data burst has 10 bits, then the positive write pointer WR_PNTR_POS<3:0> will have a value of (0010) to read the first bit of that next data burst into flip-flop 204, the negative write pointer WR_PNTR_NEG<3:0> will have a value of (0010) to read the second bit of that next data burst into flip-flop 212, and so on. In another implementation of FPGA 102, the positive and negative write pointers may be reset to (0001) at the beginning of each different data burst.

As bits are read by flip-flops 202-216, the eight most-recent bit values are applied by those flip-flops to the data inputs of muxes 218 and 220. Table II shows the sequence of processing of muxes 218 and 220 to read bits b0-b9 out of FIFO 124 of FIG. 2, according to one implementation of FPGA 102.

TABLE II

FIFO OUTPUT OPERATIONS

| RD PNTR POS<3:0> | RD PNTR NEG<3:0> | Mux 218 Output | Mux 220 Output |
|---|---|---|---|
| (0001) | | b0 | |
| | (0001) | | b1 |
| (0010) | | b2 | |
| | (0010) | | b3 |
| (0100) | | b4 | |
| | (0100) | | b5 |
| (1000) | | b6 | |
| | (1000) | | b7 |
| (0001) | | b8 | |
| | (0001) | | b9 |

As indicated in Table II, when the positive read pointer RD_PNTR_POS<3:0> has a value of (0001), bit b0 is output by mux 218. Similarly, when the negative read pointer RD_PNTR_NEG<3:0> has a value of (0001), bit b1 is output by mux 220. When the positive read pointer RD_PNTR_POS<3:0> has a value of (0010), bit b2 is output by mux 218, and, when the negative read pointer RD_PNTR_NEG<3:0> has a value of (0010), bit b3 is output by mux 220. The processing continues in a similar manner until bit b7 is output by mux 220. After that, the positive and negative read pointers recycle to (0001) to enable bits b8 and b9 output by muxes 218 and 220, respectively.

As shown in FIG. 2, the timing of the writing of data into FIFO 124 is controlled by the FIFO write clock WR_CLK, which is based on the strobe clock DQS provided by SDRAM 104 of FIG. 1, while the timing of the reading of data out of FIFO 124 is controlled by the continuous FIFO read clock RD_CLK, which is based on a local FPGA reference clock. In this way, FIFO 124 provides conversion from the SDRAM's non-continuous clock domain to the FPGA's continuous clock domain.

Since, as described previously, the strobe clock DQS is asynchronous with respect to the FPGA reference clocks, the FIFO write clock WR_CLK will also be asynchronous with respect to the FIFO read clock RD_CLK. Nevertheless, the depth of the two bit buffers formed by flip-flops 202-208 and flip-flops 210-216, respectively, enables FIFO 124 to handle any expected asynchronization between the FIFO write and read clocks. For example, due to the depth of the bit buffer formed by flip-flops 202-208, FIFO 124 can output bit b0 at any time prior to the arrival of bit b8 (i.e., almost four full clock cycles after bit b0 is written into FIFO 124). Similarly, due to the depth of the bit buffer formed by flip-flops 210-216, FIFO 124 can output bit b1 at any time prior to the arrival of bit b9 (i.e., almost four full clock cycles after bit b1 is written into FIFO 124).

To control the operations of each FIFO 124 shown in Tables I and II and to handle the asynchronization between the FIFO write and read clocks, FIFO controller 122 of FIG. 1 is designed to generate appropriate values for the positive and negative read and write pointers to apply to the eight FIFOs 124 of FIG. 1 at appropriate times.

Figure 3:
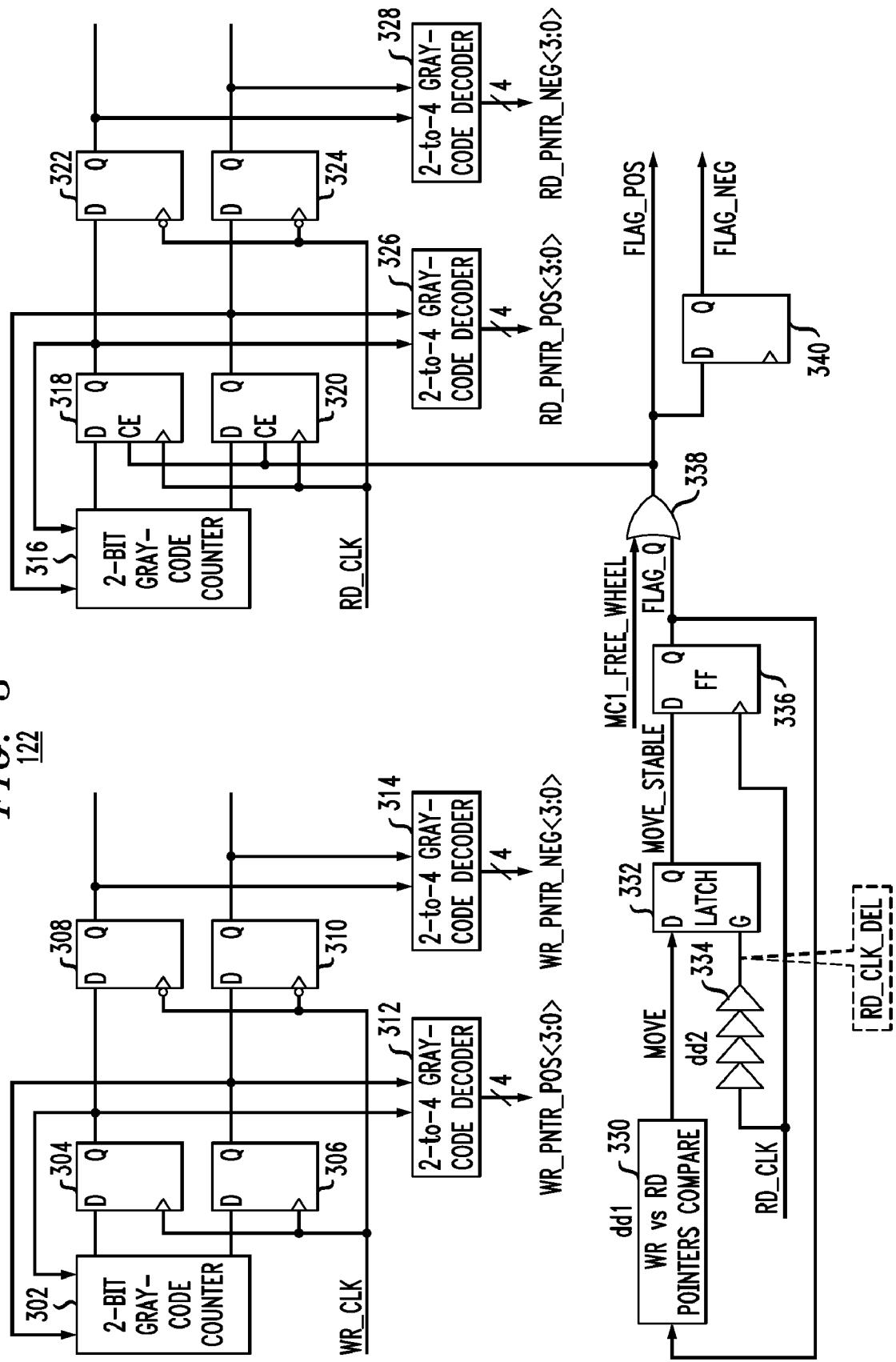
FIG. 3 shows a schematic block diagram of the FIFO controller of FIG. 1, according to one embodiment of the present invention.

FIG. 3 shows a schematic block diagram of FIFO controller 122 of FIG. 1, according to one embodiment of the present invention. In this embodiment, 2-bit gray-code counter logic block 302 and flip-flops 304 and 306 form a first 2-bit gray-code counter that generates a first 2-bit gray-code signal that transitions between successive 2-bit gray-code values at rising edges of the FIFO write clock WR_CLK. Similarly, flip-flops 308 and 310 form a second 2-bit gray-code counter that generates a second 2-bit gray-code signal that transitions between successive 2-bit gray-code values at falling edges of the FIFO write clock WR_CLK. Gray-code decoder logic block 312 decodes the first 2-bit gray-code signal to generate the 4-bit positive write pointer WR_PNTR_POS<3:0>, while gray-code decoder logic block 314 decodes the second 2-bit gray-code signal to generate the 4-bit negative write pointer WR_PNTR_NEG<3:0>.

Analogously, 2-bit gray-code counter logic block 316 and flip-flops 318 and 320 form a third 2-bit gray-code counter that generates a third 2-bit gray-code signal that transitions between successive 2-bit gray-code values at rising edges of the FIFO read clock RD_CLK. Similarly, flip-flops 322 and 324 form a fourth 2-bit gray-code counter that generates a fourth 2-bit gray-code signal that transitions between successive 2-bit gray-code values at falling edges of the FIFO read clock RD_CLK. Gray-code decoder logic block 326 decodes the third 2-bit gray-code signal to generate the 4-bit positive read pointer RD_PNTR_POS<3:0>, while gray-code decoder logic block 328 decodes the fourth 2-bit gray-code signal to generate the 4-bit negative read pointer RD_PNTR_NEG<3:0>.

Table III shows the sequence of 2-bit gray-code values and corresponding 4-bit pointer values for one implementation of the gray-code counters and decoders of FIFO controller 122. Each of gray-code counter logic blocks 302 and 316 is designed to generate and repeat the sequence of 2-bit values shown in Table III. Similarly, each of gray-code decoder logic blocks 312, 314, 326, and 328 generates the 4-bit pointer value shown in Table III for each corresponding 2-bit gray-code value.

TABLE III

GRAY-CODE/POINTER SEQUENCING

| 2-Bit Gray Code | 4-Bit Pointer |
|---|---|
| 00 | (0001) |
| 01 | (0010) |
| 11 | (0100) |
| 10 | (1000) |

Any suitable configurations of combinatorial logic may be used to implement the gray-code counter and decoder logic blocks. Although gray-code decoders 312, 314, 326, and 328 are depicted as being implemented in FIFO controller 122, in alternative implementations, those decoders can be implemented within each FIFO 124. Although these alternative implementations require the implementation of distinct decoders for each FIFO, such implementations may avoid contention from routing skew differences in the pointer signals.

As shown in FIG. 3, the data output Q of flip-flop 304 is applied to the data input D of flip-flop 308, to 2-bit gray-code counter 302, and to gray-code decoder 312. Similarly, the data output Q of flip-flop 306 is applied to the data input D of flip-flop 310, to 2-bit gray-code counter 302, and to gray-code decoder 312.

Flip-flops 304 and 306 are initialized to generate and maintain a 2-bit gray-code output value of (00) while the FIFO write clock WR_CLK remains low (i.e., 0). Note that, while clock DQS0 may be tri-stated between read bursts, WR_CLK is kept at 0 before and after such read bursts, since clocks within an FPGA are normally either 0 or 1, and not tri-statable, due to the nature of the CMOS transistors used to implement such FPGAs. The gray-code value of (00) causes (1) decoder 312 to generate a value of (0001) for WR_PNTR_POS<3:0> and (2) counter 302 to generate a gray-code value of (01). When the first burst of the strobed FIFO write clock WR_CLK is received, the 2-bit gray-code value (01) is output from flip-flops 304 and 306 at the first rising edge of WR_CLK. This 2-bit gray-code value is applied (1) to decoder 312, which generates the corresponding positive write pointer value of (0010), (2) to the data inputs of flip-flops 308 and 310, which output the 2-bit gray-code value to decoder 314 at the first falling edge of WR_CLK, and (3) to counter logic block 302, which uses this feedback signal to increment its 2-bit gray-code output value to (11). This new 2-bit gray-code value is output from flip-flops 304 and 306 at the next rising edge of WR_CLK, thereby continuing the sequence of gray-code values and positive and negative write pointer values, as indicated in Table III.

In one implementation, after the last falling edge of the current burst of FIFO write clock WR_CLK, the 2-bit gray-code counter and decoders maintain their values while the FIFO write clock is kept at 0 until the first rising edge of the next burst of the strobed FIFO write clock is received, at which point the sequence is continued from where it left off.

Like flip-flops 304 and 306, flip-flops 318 and 320 are also initialized to generate and maintain a 2-bit gray-code output value of (00). However, since flip-flops 318 and 320 are clocked by a continuous clock (i.e., FIFO read clock RD_CLK), to ensure that the data are read out from FIFOs 124 at appropriate times, flip-flops 318 and 320 are selectively enabled based on flag FLAG_POS. In particular, flip-flops 318 and 320 output their data only when flag FLAG_POS has a logic value of 1. In that case, the processing of counter 316, flip-flops 318-324, and decoders 326 and 328 is analogous to that of counter 302, flip-flops 304-310, and decoders 312 and 314, albeit clocked by the FIFO read clock RD_CLK to generate the positive and negative read pointers RD_PNTR_POS<3:0> and RD_PNTR_NEG<3:0>.

To generate the flag FLAG_POS, comparison block 330, which is preferably implemented using combinatorial logic, compares the positive write pointer WR_PNTR_POS<3:0> to the positive read pointer RD_PNTR_POS<3:0> based on the value of flag FLAG_Q and provides output signal MOVE to the data input of latch 332. If FLAG_Q is 0, then comparison block 330 compares the positive write pointer WR_PNTR_POS<3:0> directly to the positive read pointer RD_PNTR_POS<3:0>. If, however, FLAG_Q is 1, then comparison block 330 compares the positive write pointer WR_PNTR_POS<3:0> to the next value for the positive read pointer RD_PNTR_POS<3:0>. For example, if the positive read pointer RD_PNTR_POS<3:0> is (0001), then the next value for the positive read pointer RD_PNTR_POS<3:0> is (0010). Note that, if the positive read pointer RD_PNTR_POS<3:0> is (1000), then the next value for the positive read pointer RD_PNTR_POS<3:0> is (0001).

If the result of the comparison performed by comparison block 330 is that the two compared values match, then the comparison block sets the output signal MOVE low. If, however, the result of the comparison performed by comparison block 330 is that the two compared values do not match, then the comparison block sets output signal MOVE high.

Latch 332 is gated by delayed FIFO read clock RD_CLK_DEL, which is a delayed version of the FIFO read clock RD_CLK generated by several (e.g., four) serially-connected delay elements 334. The number of delay elements 334 for a particular implementation will depend upon the targeted operating frequency, the hold-time requirement of flip-flop 336, and the amount of delay provided by each delay element 334. As discussed again later in this specification, in one implementation, the total delay dd2 provided by delay elements 334 is greater than the hold-time requirement of flip-flop 336, but less than half a clock cycle over all expected process, voltage, and temperature (PVT) conditions.

While the delayed FIFO read clock RD_CLK_DEL is high, latch 332 presents the value at its data input D at its data output Q. This output signal MOVE_STABLE is applied to the data input D of flip-flop 336, which is clocked by rising edges in the FIFO read clock RD_CLK. The output FLAG_Q of flip-flop 336 is applied to comparison block 330 and to logic-OR gate 338, which also receives override control signal MC1_FREE_WHEEL and whose output is the flag FLAG_POS. In addition to being applied to selectively enable flip-flops 318 and 320, FLAG_POS is also applied to the data input D of flip-flop 340, which is clocked by the FIFO read clock RD_CLK to generate the flag FLAG_NEG.

In addition to being used within FIFO controller 122, FLAG_POS along with FLAG_NEG are used by other circuitry within FPGA 102, such as by gearing blocks 126 (as indicated by the label "flags" in FIG. 1), as indicators of valid data traffic from positive and negative flip-flops, respectively.

To override the processing of elements 330-336, override control signal MC1_FREE_WHEEL may be set to 1, in which case, FLAG_POS will always be 1 and flip-flops 318 and 320 will always be enabled. Such operations may be desirable, e.g., when clock DQS0 is a continuous clock. Note that OR gate 338 and override control signal MC1_FREE_WHEEL may be omitted, e.g., for embodiments in which clock DQS0 is always non-continuous.

Figure 4:
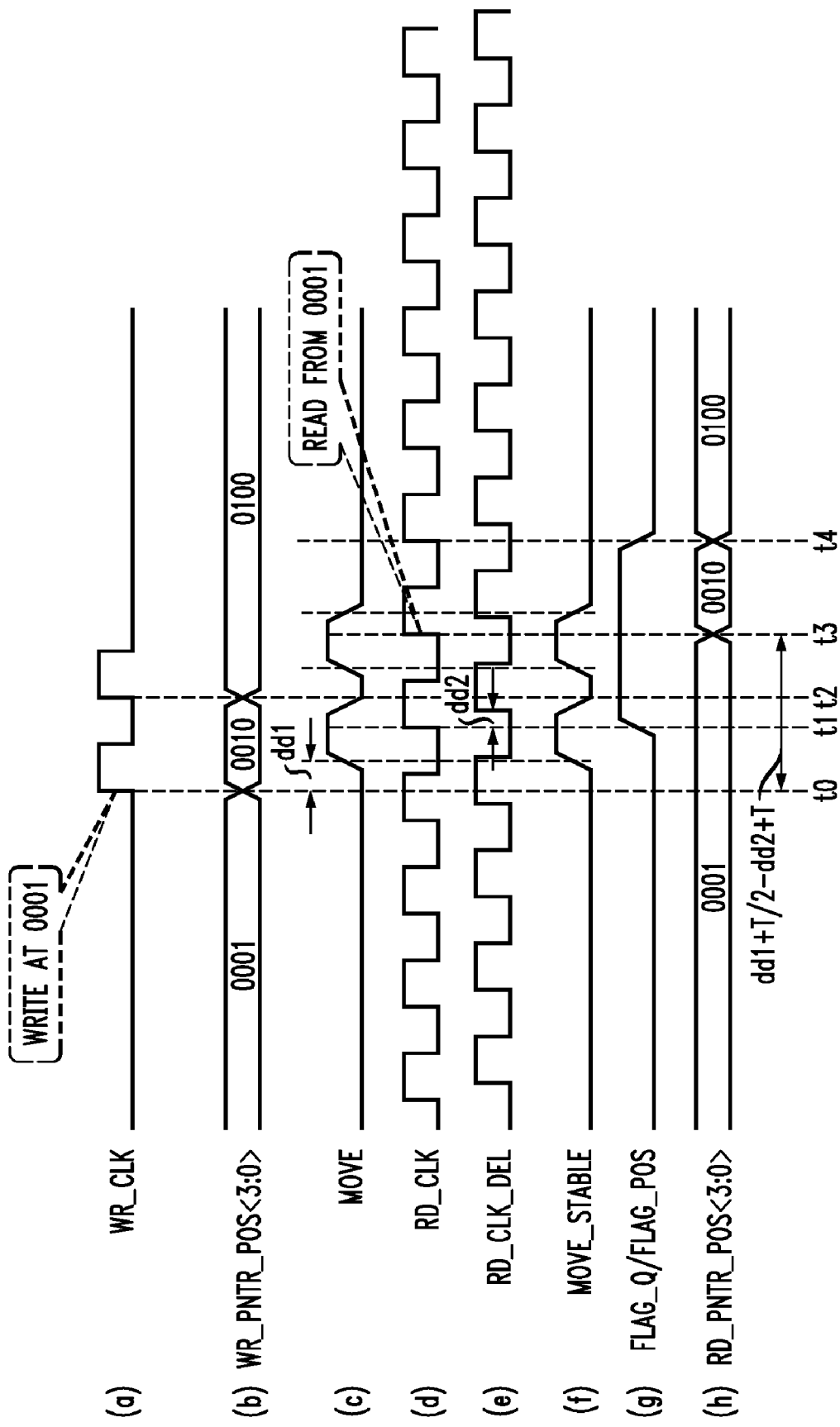
FIG. 4 shows a timing diagram of various signals in FIGS. 1-3 for minimal phase offset between the FIFO write and read clocks during an SDRAM read operation.

FIG. 4 shows a timing diagram of various signals in FIGS. 1-3 for minimal phase offset between the FIFO write and read clocks during an SDRAM read operation, where:

Waveform (a) shows the non-continuous FIFO write clock WR_CLK. In this particular SDRAM read operation, WR_CLK has two clock pulses, corresponding to a 4-bit DDR burst. Note that, before and after the read operation, WR_CLK is 0, as indicated in waveform (a).

Waveform (b) shows the positive write pointers WR_PNTR_POS<3:0> generated by decoder 312 of FIG. 3 and applied to each FIFO 124 of FIGS. 1-2.

Waveform (c) shows the signal MOVE generated by comparator 330 of FIG. 3.

Waveform (d) shows the FIFO read clock RD_CLK.

Waveform (e) shows the delayed FIFO read clock RD_CLK_DEL generated by delay elements 334 of FIG. 3.

Waveform (f) shows the signal MOVE_STABLE output from latch 332 of FIG. 3.

Waveform (g) shows the flag FLAG_Q output from flip-flop 336 of FIG. 3. Since, in this scenario, the override control signal MC1_FREE_WHEEL is at logic 0, waveform (g) also shows the flag FLAG_POS output from OR gate 338 of FIG. 3.

Waveform (h) shows the positive read pointers RD_PNTR_POS<3:0> generated by decoder 326 of FIG. 3 and applied to each FIFO 124 of FIGS. 1-2.

As represented in FIG. 4, FPGA 102 is initialized such that the positive write pointers WR_PNTR_POS<3:0> and the positive read pointers RD_PNTR_POS<3:0> are both (0001), and the flags MOVE_STABLE and FLAG_Q are both logic 0. Prior to the first rising edge of WR_CLK (i.e., prior to time to), since FLAG_Q is 0 and WR_PNTR_POS<3:0> is equal to RD_PNTR_POS<3:0>, comparison block 330 generates a value of 0 for flag MOVE. As such, flag MOVE_STABLE remains at 0 even when the delayed FIFO read clock RD_CLK_DEL is high, and therefore flags FLAG_Q and FLAG_POS remain at 0 even at rising edges of the FIFO read clock RD_CLK. As a result, flip-flops 318 and 320 of FIG. 3 remain disabled, which keeps RD_PNTR_POS<3:0> at (0001), even at rising edges of the continuous FIFO read clock RD_CLK.

At the first rising edge of WR_CLK at time t0, WR_PNTR_POS<3:0> transitions from (0001) to (0010). Since WR_PNTR_POS<3:0> is now different from RD_PNTR_POS<3:0>, flag MOVE generated by comparison block 330 goes high after a processing delay of dd1.

In this scenario, the next falling edge of RD_CLK_DEL occurs just after MOVE goes high. As such, RD_CLK_DEL is still high when MOVE goes high, thereby causing MOVE_STABLE to go high (due to latch 332 being enabled) just before RD_CLK_DEL goes low and then MOVE_STABLE stays high after RD_CLK_DEL goes low (due to latch 332 being disabled).

At the next rising edge of RD_CLK (i.e., time t1), flip-flop 336 is triggered and FLAG_Q goes high, which also causes FLAG_POS to go high. With FLAG_Q high, comparison block 330 compares WR_PNTR_POS<3:0> with the next value of RD_PNTR_POS<3:0>. Since WR_PNTR_POS<3:0> is now (0010) and RD_PNTR_POS<3:0> is still (0001), comparison block 330 drives MOVE low, because WR_PNTR_POS<3:0> is equal to the next value of RD_PNTR_POS<3:0>.

When RD_CLK_DEL next goes high following time t1, latch 332 drives MOVE_STABLE low, but FLAG_Q and therefore FLAG_POS stay high, because the next rising edge of RD_CLK does not occur until time t3. Before that happens, however, at time t2, the next rising edge of WR_CLK occurs, which causes WR_PNTR_POS<3:0> to change to (0100). At this point, WR_PNTR_POS<3:0> no longer equals the next value of RD_PNTR_POS<3:0>, and comparison block 330 drives MOVE high.

As in the previous cycle, the next falling edge of RD_CLK_DEL occurs just after MOVE goes high. As such, RD_CLK_DEL is still high when MOVE goes high, thereby causing MOVE_STABLE to go high just before RD_CLK_DEL goes low and then MOVE_STABLE stays high after RD_CLK_DEL goes low.

At the next rising edge of RD_CLK at time t3, flip-flop 336 is again triggered and FLAG_Q stays high, which also causes FLAG_POS to stay high. In this case, however, since FLAG_POS was already high (thereby enabling flip-flops 318 and 320), when RD_CLK goes high at time t3, flip-flops 318 and 320 are triggered, which causes RD_PNTR_POS<3:0> to change to (0010).

With FLAG_Q staying high, comparison block 330 continues to compare WR_PNTR_POS<3:0> with the next value of RD_PNTR_POS<3:0>. Now, however, since WR_PNTR_POS<3:0> is (0100) and RD_PNTR_POS<3:0> is now (0010), comparison block 330 drives MOVE low, because WR_PNTR_POS<3:0> is again equal to the next value of RD_PNTR_POS<3:0>.

When RD_CLK_DEL next goes high following time t3, latch 332 drives MOVE_STABLE low, but FLAG_Q and therefore FLAG_POS stay high, because the next rising edge of RD_CLK does not occur until time t4. Since there are no more rising edges in WR_CLK, WR_PNTR_POS<3:0> remains at (0100).

At the next rising edge of RD_CLK at time t4, since FLAG_POS was previously high, flip-flops 318 and 320 are triggered, which causes RD_PNTR_POS<3:0> to change to (0100). At the same time, flip-flop 336 is again triggered and FLAG_Q now goes low, which also causes FLAG_POS to go low and stay low (along with MOVE and MOVE_STABLE) until the next burst of WR_CLK during a subsequent read operation.

As indicated in FIG. 4, a data bit (e.g., b0) is written into each FIFO 124 at time t0, and those same data bits are read from FIFOs 124 at time t3, before those data bits can be overwritten.

Figure 5:
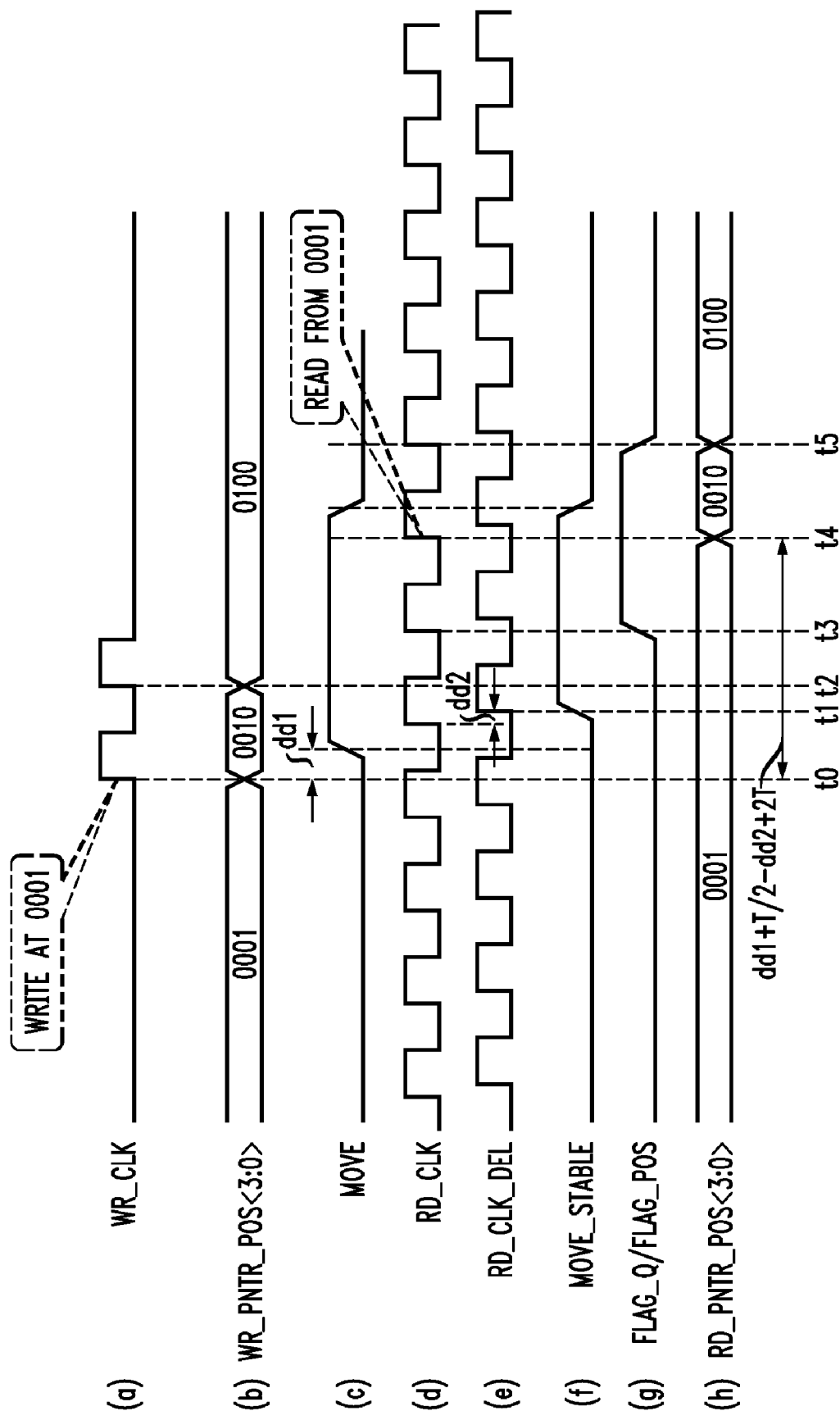
FIG. 5 shows a timing diagram of various signals in FIGS. 1-3 for maximal phase offset between the FIFO write and read clocks during an SDRAM read operation.

FIG. 5 shows a timing diagram of various signals in FIGS. 1-3 for maximal phase offset between the FIFO write and read clocks during an SDRAM read operation, where waveforms (a)-(h) are analogous to those in FIG. 4. The initialization of pointers and flags and the operations at time t0 in FIG. 5 are the same as in FIG. 4.

In this scenario, however, the next falling edge of RD_CLK_DEL occurs just before MOVE goes high. As such, RD_CLK_DEL is still already low when MOVE goes high, thereby causing MOVE_STABLE to stay low, and MOVE_STABLE stays low until RD_CLK_DEL next goes high at time t1.

Since MOVE_STABLE is still low at the next rising edge of RD_CLK following time to, triggering flip-flop 336 keeps FLAG_Q and therefore FLAG_POS low, thereby keeping flip-flops 318 and 320 disabled and preventing RD_PNTR_POS<3:0> from changing.

At the next rising edge of RD_CLK_DEL at time t1, latch 332 drives MOVE_STABLE high.

At the next rising edge of WR_CL at time t2, WR_PNTR_POS<3:0> changes to (0100), which in turn keeps MOVE high, since WR_PNTR_POS<3:0> is still different from RD_PNTR_POS<3:0>.

At the next rising edge of RD_CLK at time t3, flip-flop 336 finally drives FLAG_Q and FLAG_POS high. With FLAG_Q high, comparison block 330 now compares WR_PNTR_POS<3:0> with the next value of RD_PNTR_POS<3:0>, but, with WR_PNTR_POS<3:0> equal to (0100) and RD_PNTR_POS<3:0> still at (0001), MOVE stays high.

At the next rising edge of RD_CLK at time t4, with FLAG_POS high, flip-flops 318 and 320 are triggered, thereby finally changing RD_PNTR_POS<3:0> to (0010). With FLAG_Q still high, comparison block 330 continues to compare WR_PNTR_POS<3:0> with the next value of RD_PNTR_POS<3:0>, but now, with WR_PNTR_POS<3:0> equal to (0100) and RD_PNTR_POS<3:0> still at (0010), MOVE is driven low, which also drives MOVE_STABLE low, since RD_CLK_DEL is high.

At the next rising edge of RD_CLK at time t5, with FLAG_POS still high, flip-flops 318 and 320 are again triggered, which causes RD_PNTR_POS<3:0> to change to (0100). At the same time, flip-flop 336 is again triggered and FLAG_Q now goes low, which also causes FLAG_POS to go low and stay low (along with MOVE and MOVE_STABLE) until the next burst of WR_CLK during a subsequent read operation.

As indicated in FIG. 5, a data bit (e.g., b0) is written into each FIFO 124 at time t0, and those same data bits are read from FIFOs 124 at time t4, before those data bits can be overwritten.

Since the bit buffers in FIFO 124 are four bits deep, the maximum delay between the time that a bit is written into a flip-flop in FIFO 124 and the time that it is read from that same flip-flop must be less than four clock cycles; otherwise, the bit may get overwritten before it has a chance to be read out. In the design of FIGS. 2 and 3, the minimum delay DELmin from write to read is $T+dd1+T/2-dd2$, where $dd1+T/2-dd2$ is the shortest time that a write-pointer change can trigger a FLAG_Q change, dd1 is the delay associated with comparison block 330, T/2 dd2 is applied by delay elements 334 to generated RD_CLK_DEL from RD_CLK, and T represents the one-cycle delay that the signal FLAG_Q needs to trigger a read pointer change. Similarly, the maximum delay DELmax from write to read is dd1+2T+T/2−dd2, where dd1+T+T/2−dd2 is the longest time that a write-pointer change will trigger a FLAG_Q change. As long as the circuitry is designed such that dd1<T and dd2<T/2, then DELmin will be greater than T, and DELmax will be less than 3.5T. If the design can guarantee that dd1−dd2<T/2, then DELmax will be less than 3T, and the depth of the bit buffers in FIFO 114 can be reduced to 3 bits. Of course, bit buffers deeper than four bits could be used.

As shown in the timing diagrams of FIGS. 4 and 5, the flag-generation circuitry (i.e., elements 330-338) of FIFO controller 122 of FIG. 3 allows the read pointers to catch up with the write pointers, while avoiding metastability issues that could arise if the read pointers are updated too soon. Thus, latch 332 is gated by RD_CLK_DEL, a slightly delayed version of the FIFO read clock RD_CLK, to ensure that MOVE_STABLE is not changing during the setup-and-hold window of flip-flop 336. As such, MOVE_STABLE will be stable before and slightly after each rising edge of RD_CLK, thus avoiding any metastability issues for flip-flop 336.

Figure 6:
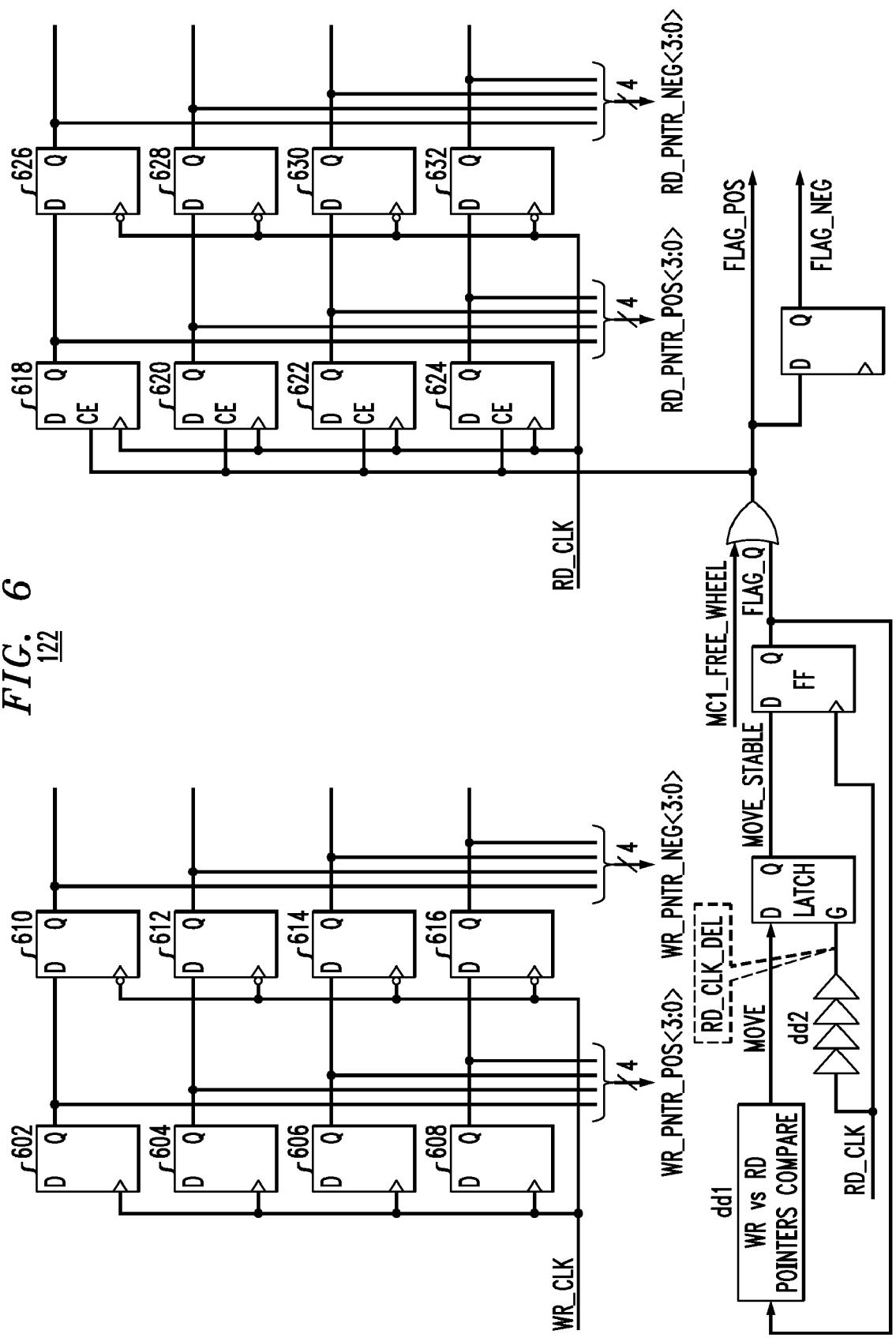
FIG. 6 shows a schematic block diagram of the FIFO controller of FIG. 1, according to another embodiment of the present invention.

FIG. 6 shows a schematic block diagram of FIFO controller 122 of FIG. 1, according to another embodiment of the present invention. In this embodiment, instead of using 2-bit gray-code counters and decoders to generate the positive and negative write and read pointers, four 4-bit shift registers are used to generate pointer values directly. In particular, flip-flops 602-608 form a first 4-bit shift register that generates the positive write pointer WR_PNTR_POS<3:0>, flip-flops 610-616 form a second 4-bit shift register that generates the negative write pointer WR_PNTR_NEG<3:0>, flip-flops 618-624 form a third 4-bit shift register that generates the positive read pointer RD_PNTR_POS<3:0>, and flip-flops 626-632 form a fourth 4-bit shift register that generates the negative read pointer RD_PNTR_NEG<3:0>. Although not explicitly shown in FIG. 6, the flip-flops within each shift register are connected in a conventional circular manner to form a circular shift register. In one implementation, each set of flip-flips is initiated to (0001). The embodiment of FIG. 6 uses flag-generation circuitry identical to that of FIG. 3 to generate the flag FLAG_POS, which, in FIG. 6, is used to selectively enable flip-flops 618-624. The timing diagrams of FIGS. 4 and 5 also apply to the embodiment of FIG. 6.

As described earlier, certain embodiments of the distributed front-end FIFO architecture of the present invention may be used to send incoming data from a non-continuous read strobe domain into a continuous clock domain. The FIFO architecture stays idle if there is no incoming data traffic. If read data starts to come in, then the data will be written into the FIFO architecture based on the strobe clock and read out at the other end of the FIFO architecture by the continuous clock. The FIFO architecture guarantees that the clock-domain crossing is void of set/hold violations. In this way, the FIFO architecture solves the read-data-recapture-to-continuous-clock-domain problem. At the same time, whether the FIFO pointers are changing or not serves as an indication of whether there is read data traffic and this indication can be converted into read data valid signals.

The FIFO architecture takes advantage of the lane structure of the memory interface, where all of the data lines within a lane shares the same FIFO controller that generates FIFO write and read pointers and each data line has a FIFO slave circuit having flip-flops, into which data are written and from which data are read. In this way, relatively little logic is added to each individual I/O block.

The FIFO architecture can also be used for continuous read interfaces, like QDR and RLDRAM. The FIFO architecture can operate at relatively high speed where the data width is relatively narrow, thereby avoiding having to implement a much wider FIFO after the data speed has been decreased by demultiplexing the data streams by a factor of 2, 4, or even more for core processing.

The writing of odd and even bits into different bit buffers in each FIFO 124 eliminates half-cycle paths and allows the whole scheme to run at relatively high speed.

FIG. 1 shows a single FIFO controller 122, which controls eight different FIFOs 124 corresponding to a single 8-bit data lane. In certain embodiments, FPGA 102 may have one or more other FIFO controllers, analogous to FIFO controller 122, each of which controls a different set of FIFOs, analogous to FIFOs 124. Moreover, in certain embodiments, a single FIFO controller may control multiple sets of FIFOs corresponding to multiple multi-bit data lanes.

Furthermore, the FPGA may be programmably configurable such that any one or more of a plurality of FIFO controllers may be programmably configured to control different combinations of FIFO sets corresponding to different data lanes. For example, an FPGA may have FIFO controllers A and B and FIFO sets C and D corresponding to data lanes C and D, respectively, where the FPGA can be configured to support any of the following configurations: (i) FIFO controller A controls FIFO sets C and D, (ii) FIFO controller B controls FIFO sets C and D, (iii) FIFO controller A controls FIFO set C, while FIFO controller B controls FIFO set D, and (iv) FIFO controller A controls FIFO set D, while FIFO controller B controls FIFO set C.

Although the present invention has been described in the context of an interface that supports DDR data transfer in which bit transitions correspond to both rising and falling clock edges, the present invention can also be implemented in the context of interfaces that support data transfer in which bit transitions correspond to only rising clock edges or only falling clock edges. In these embodiments, each FIFO 124 would need only half the circuitry shown in FIG. 2, such as flip-flops 202-208, mux 218, and flip-flop 222, and, since FIFO controller 122 would need to generate only one set of write and read pointers, such as WR_PNTR_POS<3:0> and RD_PNTR_POS<3:0>, FIFO controller 122 of FIG. 3 could be implemented without flip-flops 308-310 and 322-324 and gray-code decoders 314 and 328.

Although the present invention has been described in the context of memory read operations, the present invention can also be implemented at the memory side of the interface between two electronic components for memory write operations, where, for example, a memory device receives write data from a memory controller, or any other suitable source-synchronized receive operations. Although the present invention has been described in the context of an interface between an FPGA and an SDRAM, those skilled in the art will understand that the present invention can be implemented in the context of other interfaces between other types of devices. For example, in other situations, the FPGA can be another suitable integrated circuit device, such as, without limitation, an application-specific integrated circuit (ASIC), a programmable logic device (PLD), a mask-programmable gate array (MPGA), a simple programmable logic device (SPLD), and a complex programmable logic device (CPLD). Similarly, in other situations, the SDRAM can be another suitable integrated circuit device, such as a different type of memory device such as, without limitation, SRAM (QDR) and all suitable DRAM families (e.g., RLDRAM, GDDR (graphics memory), XDR, RDRAM (Rambus)), or a non-memory device such as, without limitation, SPI4 interface devices, A/D and D/A converters, Rapid IO interface devices, Hyper transport devices, DSPs, CPUs, AGPs, and network processors. In general, the present invention can be implemented for any interface for data transfer in which the clock provided with the data is asynchronous with the local reference clock at the receiving device. Note that, depending on the particular embodiment, the provided clock may be a continuous clock or a non-continuous clock.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. An integrated circuit comprising:
   one or more data I/O blocks, at least one data I/O block adapted to receive an incoming bit stream from an external device;
   a clock I/O block adapted to receive an incoming clock signal from the external device, wherein the incoming clock signal is asynchronous with a local reference clock signal of the integrated circuit;
   one or more FIFOs, at least one FIFO connected to receive a corresponding incoming bit stream from a corresponding data I/O block; and
   a FIFO controller adapted to control operations of the one or more FIFOs, such that:
      bits from the corresponding data I/O block are written into the at least one FIFO using a FIFO write clock that is based on the incoming clock signal; and
      bits are read out from the at least one FIFO using a FIFO read clock that is based on the local reference clock signal.

2. The invention of claim 1, wherein the incoming clock signal is a non-continuous strobe signal.

3. The invention of claim 1, wherein each FIFO comprises:
   a first bit buffer comprising a plurality of first write-data flip-flops, each first write-data flip-flip comprising a data input, an enable input, a clock input, and a data output;
   a first mux comprising a plurality of data inputs, a control input, and a data output; and
   a first read-data flip-flop comprising a data input, a clock input, and a data output, wherein:
      the data input of each first write-data flip-flop is connected to the corresponding data I/O block;
      the enable input of each first write-data flip-flop is connected to receive a first write pointer generated by the FIFO controller;
      the clock input of each first write-data flip-flop is connected to receive the FIFO write clock;
      the data output of each first write-data flip-flop is connected to a different data input of the first mux;
      the control input of the first mux is connected to receive a first read pointer generated by the FIFO controller;
      the data output of the first mux is connected to the data input of the first read-data flip-flop; and
      the clock input of the first read-data flip-flop is connected to receive the FIFO read clock.

4. The invention of claim 3, wherein each FIFO further comprises:
   a second bit buffer comprising a plurality of second write-data flip-flops, each second write-data flip-flip comprising a data input, an enable input, a clock input, and a data output;
   a second mux comprising a plurality of data inputs, a control input, and a data output; and
   a second read-data flip-flop comprising a data input, a clock input, and a data output, wherein:
      the data input of each second write-data flip-flop is connected to the corresponding data I/O block;
      the enable input of each second write-data flip-flop is connected to receive a second write pointer generated by the FIFO controller;
      the clock input of each second write-data flip-flop is connected to receive the FIFO write clock;
      the data output of each second write-data flip-flop is connected to a different data input of the second mux;
      the control input of the second mux is connected to receive a second read pointer generated by the FIFO controller;
      the data output of the second mux is connected to the data input of the second read-data flip-flop;
      the clock input of the second read-data flip-flop is connected to receive the FIFO read clock;
      the second write-data flip-flops are triggered by opposite clock edges of the FIFO write clock from the first write-data flip-flops; and the second read-data flip-flop is triggered by opposite clock edges of the FIFO read clock from the first read-data flip-flop.

5. The invention of claim 3, wherein:
the first bit buffer comprises four first write-data flip-flops; and
the first mux comprises four data inputs.

6. The invention of claim 1, wherein the FIFO controller comprises:
write-pointer circuitry adapted to generate, based on the FIFO write clock, write pointers for controlling the writing of bits into each FIFO; and
read-pointer circuitry adapted to generate, based on the FIFO read clock, read pointers for controlling the reading of bits from each FIFO.

7. The invention of claim 6, wherein:
the write-pointer circuitry comprises:
a first write gray-code counter adapted to generate a first write gray-code value; and
a first write gray-code decoder adapted to generate a first write pointer from the first write gray-code value; and
the read-pointer circuitry comprises:
a first read gray-code counter adapted to generate a first read gray-code value; and
a first read gray-code decoder adapted to generate a first read pointer from the first read gray-code value.

8. The invention of claim 7, wherein:
the write-pointer circuitry further comprises:
a second write gray-code counter adapted to generate a second write gray-code value; and
a second write gray-code decoder adapted to generate a second write pointer from the second write gray-code value;
the read-pointer circuitry further comprises:
a second read gray-code counter adapted to generate a second read gray-code value; and
a second read gray-code decoder adapted to generate a second read pointer from the second read gray-code value;
the second write gray-code counter is triggered by opposite clock edges of the FIFO write clock from the first write gray-code counter; and
the second read gray-code counter is triggered by opposite clock edges of the FIFO read clock from the first read gray-code counter.

9. The invention of claim 6, wherein:
the write-pointer circuitry comprises a first write shift register adapted to generate a first write pointer; and
the read-pointer circuitry comprises a first read shift register adapted to generate a first read pointer.

10. The invention of claim 9, wherein:
the write-pointer circuitry further comprises a second write shift register adapted to generate a second write pointer;
the read-pointer circuitry further comprises a second read shift register adapted to generate a second read pointer;
the second write shift register is triggered by opposite clock edges of the FIFO write clock from the first write shift register; and
the second read shift register is triggered by opposite clock edges of the FIFO read clock from the first read shift register.

11. The invention of claim 6, wherein the FIFO controller further comprises flag-generation circuitry adapted to generate a flag signal that selectively enables operations of the read-pointer circuitry.

12. The invention of claim 11, wherein the flag-generation circuitry is adapted to enable the operations of the read-pointer circuitry based on a comparison between one or more selected write pointers generated by the write-pointer circuitry and one or more selected read pointers generated by the read-pointer circuitry.

13. The invention of claim 12, wherein the FIFO-read controller comprises:
a comparator adapted to compare the one or more selected write pointers to the one or more selected read pointers and generate a comparison signal indicative of that comparison;
a latch comprising a data input connected to receive the comparison signal, a gate input connected to receive a delayed version of the FIFO read clock, and a data output adapted to present a latch output signal; and
a flip-flop comprising a data input connected to receive the latch output signal, a clock input connected to receive the FIFO read clock, and a data output adapted to present a flip-flop output signal, wherein the flag signal is based on the flip-flop output signal.

14. The invention of claim 13, wherein the FIFO-read controller further comprises a logic-OR gate connected to receive the flip-flop output signal and an override control signal and generate the flag signal.

15. The invention of claim 1, wherein:
the incoming clock signal is a non-continuous strobe signal,
each FIFO comprises:
a first bit buffer comprising a plurality of first write-data flip-flops, each first write-data flip-flip comprising a data input, an enable input, a clock input, and a data output;
a first mux comprising a plurality of data inputs, a control input, and a data output;
a first read-data flip-flop comprising a data input, a clock input, and a data output;
a second bit buffer comprising a plurality of second write-data flip-flops, each second write-data flip-flip comprising a data input, an enable input, a clock input, and a data output;
a second mux comprising a plurality of data inputs, a control input, and a data output; and
a second read-data flip-flop comprising a data input, a clock input, and a data output, wherein:
the data input of each first write-data flip-flop is connected to the corresponding data I/O block;
the enable input of each first write-data flip-flop is connected to receive a first write pointer generated by the FIFO controller;
the clock input of each first write-data flip-flop is connected to receive the FIFO write clock;
the data output of each first write-data flip-flop is connected to a different data input of the first mux;
the control input of the first mux is connected to receive a first read pointer generated by the FIFO controller;
the data output of the first mux is connected to the data input of the first read-data flip-flop;
the clock input of the first read-data flip-flop is connected to receive the FIFO read clock;
the data input of each second write-data flip-flop is connected to the corresponding data I/O block;
the enable input of each second write-data flip-flop is connected to receive a second write pointer generated by the FIFO controller;
the clock input of each second write-data flip-flop is connected to receive the FIFO write clock;

the data output of each second write-data flip-flop is connected to a different data input of the second mux;

the control input of the second mux is connected to receive a second read pointer generated by the FIFO controller;

the data output of the second mux is connected to the data input of the second read-data flip-flop;

the clock input of the second read-data flip-flop is connected to receive the FIFO read clock;

the second write-data flip-flops are triggered by opposite clock edges of the FIFO write clock from the first write-data flip-flops; and the second read-data flip-flop is triggered by opposite clock edges of the FIFO read clock from the first read-data flip-flop;

the FIFO controller comprises:

write-pointer circuitry adapted to generate, based on the FIFO write clock, write pointers for controlling the writing of bits into each FIFO;

read-pointer circuitry adapted to generate, based on the FIFO read clock, read pointers for controlling the reading of bits from each FIFO; and flag-generation circuitry adapted to generate a flag signal that selectively enables operations of the read-pointer circuitry, wherein the flag-generation circuitry is adapted to enable the operations of the read-pointer circuitry based on a comparison between one or more selected write pointers generated by the write-pointer circuitry and one or more selected read pointers generated by the read-pointer circuitry.

16. The invention of claim 15, wherein:

the first bit buffer comprises four first write-data flip-flops; and the first mux comprises four data inputs.

17. The invention of claim 15, wherein:

the write-pointer circuitry comprises:

a first write gray-code counter adapted to generate a first write gray-code value;

a first write gray-code decoder adapted to generate a first write pointer from the first write gray-code value;

a second write gray-code counter adapted to generate a second write gray-code value; and a second write gray-code decoder adapted to generate a second write pointer from the second write gray-code value; and the read-pointer circuitry comprises:

a first read gray-code counter adapted to generate a first read gray-code value;

a first read gray-code decoder adapted to generate a first read pointer from the first read gray-code value;

a second read gray-code counter adapted to generate a second read gray-code value; and a second read gray-code decoder adapted to generate a second read pointer from the second read gray-code value;

the second write gray-code counter is triggered by opposite clock edges of the FIFO write clock from the first write gray-code counter; and the second read gray-code counter is triggered by opposite clock edges of the FIFO read clock from the first read gray-code counter.

18. The invention of claim 15, wherein:

the write-pointer circuitry comprises:

a first write shift register adapted to generate a first write pointer; and a second write shift register adapted to generate a second write pointer;

the read-pointer circuitry comprises:

a first read shift register adapted to generate a first read pointer; and a second read shift register adapted to generate a second read pointer;

the second write shift register is triggered by opposite clock edges of the FIFO write clock from the first write shift register; and the second read shift register is triggered by opposite clock edges of the FIFO read clock from the first read shift register.

19. The invention of claim 15, wherein the FIFO-read controller further comprises a logic-OR gate connected to receive the flip-flop output signal and an override control signal and generate the flag signal.

20. The invention of claim 15, wherein the FIFO-read controller comprises:

a comparator adapted to compare the one or more selected write pointers to the one or more selected read pointers and generate a comparison signal indicative of that comparison;

a latch comprising a data input connected to receive the comparison signal, a gate input connected to receive a delayed version of the FIFO read clock, and a data output adapted to present a latch output signal; and a flip-flop comprising a data input connected to receive the latch output signal, a clock input connected to receive the FIFO read clock, and a data output adapted to present a flip-flop output signal, wherein the flag signal is based on the flip-flop output signal.

\* \* \* \* \*